(12) United States Patent
Wettlaufer et al.

(10) Patent No.: US 6,457,403 B1
(45) Date of Patent: Oct. 1, 2002

(54) APPARATUS FOR PROCESSING FRUIT IN MULTIPLE LAYERS

(76) Inventors: Dale E. Wettlaufer, 2080 Grover Rd, West Falls, NY (US) 14170; Richard S. Hess, 6003 Vermont Hill Rd., South Wales, NY (US) 14139

( * ) Notice: Subject to any disclaimer, the term of this patent is extended or adjusted under 35 U.S.C. 154(b) by 0 days.

(21) Appl. No.: 10/076,788

(22) Filed: Feb. 16, 2002

(51) Int. Cl.[7] .............................. A23B 7/08; A23B 7/158
(52) U.S. Cl. .............................. 99/516; 99/495; 99/516; 99/534
(58) Field of Search .......................... 99/485–487, 494, 99/495, 496, 510, 516, 534–536; 426/50, 52, 273, 293, 290, 303, 310, 385, 425, 426, 429, 573, 486, 489, 577, 599, 615, 639, 640, 655, 658; 210/770, 225, 228; 424/195.1, 600; 100/197, 198, 202, 37, 113, 123, 131

(56) References Cited

U.S. PATENT DOCUMENTS

| | | | | |
|---|---|---|---|---|
| 1,534,050 A | * | 4/1925 | Barrielle | 426/639 |
| 1,717,258 A | * | 6/1929 | Rambaud | 426/639 |
| 1,906,295 A | * | 5/1933 | Wickenden | 426/639 |
| 2,785,071 A | * | 3/1957 | Mathews | 426/639 |
| 3,032,419 A | * | 5/1962 | Limpert | 99/534 X |
| 4,350,711 A | * | 9/1982 | Kahn et al. | 426/639 X |
| 4,626,434 A | * | 12/1986 | O'Mahony et al. | 426/639 X |
| 4,713,252 A | * | 12/1987 | Ishmail | 426/640 X |
| 4,892,665 A | * | 1/1990 | Wetlaufer | 210/770 |
| 5,275,097 A | * | 1/1994 | Wetlaufer | 100/113 |
| 5,320,861 A | * | 6/1994 | Mantius et al. | 99/495 X |
| 6,159,527 A | * | 12/2000 | Wettlaufer | 99/487 X |

* cited by examiner

Primary Examiner—Timothy F. Simone
(74) Attorney, Agent, or Firm—John C. Thompson (57) ABSTRACT

An apparatus for processing fruit in multiple layers which includes improved tank assemblies, each tank assembly including generally parallel sidewalls and spaced apart first and second ends, the sidewalls being provided with one or more openings for loading the fruit to be infused, and the sidewalls also being provided with a plurality of spaced apart discharge ports through which infused fruit may be discharged, the tank assembly further including a plurality of spaced apart screens mounted between the first and second ends for the purpose of separating layers of the fruit which is to be infused. A first conduit assembly is connected to the first end of the tank assembly through which a fluid may be introduced into the tank assembly, and a second conduit assembly is connected to the second end of the tank assembly through which a fluid may be discharged.

14 Claims, 9 Drawing Sheets

APPARATUS FOR PROCESSING FRUIT IN MULTIPLE LAYERS

TECHNICAL FIELD

The present invention relates generally to an apparatus for processing fruit in multiple layers, and more particularly to improved tanks used for processing fruit in multiple layers in accordance with the method disclosed in U.S. Pat. No. 6,159,527, the subject matter of which is incorporated herein by reference thereto.

BACKGROUND OF THE INVENTION

In the follow description and claims the term fruit should be interpreted to include other vegetable products, such as, but not limited to, celery, carrots, vanilla beans, and/or broccoli.

In U.S. Pat. No. 6,159,527 a method and apparatus are disclosed for infusing fruit with sugar by flowing an infusing liquor containing dissolved sugar and fruit juice through the processed fruit. The infusing liquor has strata of progressively higher concentrations of sugar. The flow rate is controlled so that the strata with the progressively higher concentrations of sugar only just slightly exceeds the sugar content of the fruit being infused. Thus, the infusing is done at a rate slow enough so that as fruit juice leaves the fruit it will be replaced with sugar during an osmotic transfer without causing osmotic dehydration. This slight differential in sugar contents is necessary in order to prevent osmotic dehydration. This infusion continues until the fruit reaches saturation. At saturation, the liquid inside the fruit gels, firming the fruit so that the infused fruit has a firmness similar to the firmness of the raw fruit.

Before infusion, fruits may be initially processed to condition it for infusion. The initial processing of hard fruits, such as cranberries, may include pressing it, to remove a desired quantity of juice, typically about 50–80% of the fruit juice. (The amount of juice removed may be that necessary to leave a soluble acid concentration substantially equal to that desired in the fully infused fruit.) In addition, care is exercised during pressing so that most of the cells within the fruit are not ruptured. After the initial pressing of hard fruits, the fruit is plumped up (or plumped) by replacing the juice which has been pressed out with other fluids by immersing the fruit in a mixture of water, juice and sugar. After this step has been completed, the fruit is then infused in the manner set forth above. The invention which includes pressing of a hard fruit is more fully set forth in applicant's U.S. Pat. No. 6,159,527.

The operation of the process is a continuous batch process. As shown in the various FIGS. of the patent, four tanks or vats 10, 12, 14, and 16 are used for infusing fruit, these tanks being interconnected with suitable plumbing to establish a flow path from tank 10 to tank 12 to tank 14 to tank 16 and back to tank 10. In addition, a bleed or overflow tank 18 is also provided. Fresh fruit (which may be at room temperature or frozen, and which may be processed or unprocessed fruit) is placed in the first tank in the series, and then fresh fruit is introduced sequentially in each subsequent tank in the series after suitable time intervals. Thus, at the beginning of a first time interval, fresh fruit is loaded into tank 10, at the beginning of a second time interval fresh fruit is loaded into tank 12, and so on. Fresh fruit is always loaded into a tank just before it is processed to avoid premature spoilage of the fruit.

The above identified patent describes initial processing and also continuous batch processing. In this regard, it should be noted that the initial processing is for the purpose of building up a stratified column of infusing liquor from the initial infusing liquor, which consists of a fruit juice or fruit juice concentrate which has been fortified with additional sugar if necessary to bring it to a high sugar content, typically 70 Brix. The stratified column, after the initial process has been completed, is formed of superimposed layers of liquors of differing sugar content, which vary from a Brix content equal to the initial infusing liquor at the downstream end to the Brix content of the juice which is to be extracted from the fruit at the upstream end. Preceding the upstream end after the initial processing has been completed is a column of pure fruit juice. Upstream and downstream references are derived from the fact that the infusing liquor is moved upwardly through the infusing tank during infusing. This is because the liquor with the higher sugar content has a higher specific gravity than the liquor with lower sugar content.

As the initial processing may vary from fruit to fruit, the processing of a soft fruit such as strawberries is described initially. At the start-up of infusing, and during a first time interval or cycle, a first batch of whole strawberries, which have been frozen in a conventional manner, are taken from a freezer and placed in thin layers in infusion vessel 10 shown in the aforementioned patent. If desired the strawberries may be sliced and diced after tempering and before infusion. Strawberries are infused best if the layers are not greater than 7.5 mm or 3 inches deep. For this discussion, it will be assumed that the sugar content of the strawberries is 12%, and therefore, the sugar to water weight ratio will be at or slightly below 12% (commonly referred to in the industry as Brix.) The first batch of frozen berries (which are frozen at about 5° F.) are thawed with juice for a few moments after the tank 10 has been filled, the juice having been warmed to 140° F. The fruit is covered with a screen which may be secured to tank 10 in any conventional manner. The screen secures the fruit within the tank and prevents it from floating downstream to the next tank with the flow of infusing liquor from one tank to the next.

The thawing time is determined by observing the tank. Initially, when warm water thawing liquid is introduced into the tank frost will form on the outside of the tank. When the tank is no longer frosty, the berries will have become sufficiently thawed to be infused. This thawing time period will be noted.

Next, during a second time interval an infusing liquor, which consists of a fruit juice or fruit juice concentrate which has been fortified with additional sugar if necessary to bring it to 70 Brix, is now slowly introduced into the bottom of tank 10 to progressively infuse the berries from the bottom up. When the infusing liquor is introduced into tank 10, suitable valves are opened to permit thawing liquid to flow from tank 10 to a holding tank. As the front of the 70 Brix infusing liquor moves slowly up through the berries in tank 10, stratification of the infusing liquor will occur. Thus, the initial strata of the 70 Brix infusing liquor will be diluted as fruit juice leaves the fruit through osmosis, until the leading downstream strata is essentially pure fruit juice with a Brix just slightly greater than that of the fruit, for example just above 12 Brix if the fruit has a Brix of 12. Infusing liquor which has had its Brix reduced to that of the fruit is now considered to be a juice product. Normally this full dilution of the infusing liquor will not occur in the first tank during the second time interval, but in the second tank during a third time interval. Succeeding strata of the infusing liquor (as measured in the upstream direction) will have progressively increasing Brix up to the initial Brix of the infusing liquor. Initially, the pump controls the flow rate of infusion liquor into the tank 10. It may take as little as 3 hours or as long as 12 hours or longer to fill the tank with infusion liquor, the time being established by the particular fruit and any initial processing it may have received. Thus, if osmosis is fairly rapid in a particular fruit, the tank may be filled more quickly, for example, in three hours. However, if osmosis is slow for a particular fruit, the tank may be filled more slowly, for example 12 hours. In any event, the next tank will be filled with a layer of berries and a thawing liquid a sufficient length of time before the first tank becomes completely filled, so that the berries in the second tank become thawed before the first tank becomes completely filled with infusion liquor.

During a third time interval or cycle, the 70 Brix infusing liquor is still introduced into tank 10, and suitable valves are opened to permit the front of the infusing liquor to move from tank 10 to tank 12, the flow being controlled by separate pumps. Meanwhile, suitable valves are opened to permit the thawing liquor in tank 14 to flow into holding tank 36. Before the end of this time interval new berries are introduced into tank 16 and held in place by a screen for a sufficient length of time to thaw the layer of berries. By the end of the third time interval, full, or substantially full, stratification of the infusing liquor has been achieved, and there will be no danger, or virtually no danger, of osmotic dehydration of the fruit in tanks 14 and 16, as the stratified column of infusing liquor is caused to flow into these tanks, although there may have been some osmotic dehydration in tank 12, and there was osmotic dehydration to the berries in tank 10 during start-up. The batch process will now be continuously operated.

The theory of operation for creating a stratified infusion liquor is set forth in the U.S. Pat. No. 6,159,527 and will not be repeated here.

In the design shown in aforementioned U.S. patent, the stratified column of infusing liquor passes through all of the berries in tank 10 and proceeds through tanks 12, 14, 16, and then back to tank 10 under the successive control of various pumps. Each tank holds approximately 3 inches of strawberries below the screen, plus an additional reservoir of fluid above the screen. The strawberries, for example in tank 10, reach saturation after three cycles. Although strawberries reach saturation at 55 Brix, the Brix of the infusing liquor is preferably 70 Brix, since a 70 Brix solution will not spoil over an extended period of time. After infusion is completed in any tank, the strawberries are removed from the tank for further processing. After start-up, a column of substantially pure fruit juice will precede the stratified column. Part of this column of substantially pure juice is apportioned off to a juice tank for further juice processing. Thus, a substantial juice byproduct is obtained by this infusion process.

During continuous operation, differing aspects of the invention are occurring simultaneously in each of the respective tanks. After start-up, during the continuous batch processing, the stratified liquor which is used to treat the fruit has a length of about 1½ tanks. For example, at the beginning of cycle n, fruit in tank 10 has become substantially fully saturated, and tank 10 is ready to be emptied. At this time the infusing liquor in tank 10, top and bottom, is at 70 Brix, and in the next 1½ tanks (12 and 14) it is stratified. Thus, the sugar concentration in the bottom of the next tank 12 is 70 Brix, and the sugar concentration at the top of tank 12 is in the range of 25–30 Brix. At this time the infusion liquor in the bottom half of tank 14 is partially stratified, the sugar concentration in the bottom being 25–30 Brix, and this stratification continues to about midway up the tank, where the Brix content drops to an amount just slightly more than that of the berries.

Cycle n commences when the introduction of infusion liquor is switched from tank 10 to tank 12. Cycle n may be as long as 12 hours or as little as 3 hours. After the commencement of the cycle, tank 10 must be dumped, and it must be refilled with fresh berries and thawing liquid, the fresh berries being secured in place with screen 40. Initially, during a first time period of cycle n, tank 10 is isolated from the other tanks 12–16 by closing off suitable valves (not numbered). During this same time period, flow from the infusion liquor tank is directed to the bottom of tank 12 by closing and opening suitable valves. In addition, the flow from tank 14 is directed to overflow tank 18 by opening a suitable valve. These valves may be manually operated, or they may be solenoid operated. At the conclusion of the first time period of cycle n, infusing liquor will be pumped into tank 12, and the front of the infusing liquor, which is pure fruit juice, will be pumped into overflow tank 18. The flow rate is adjusted to maintain the length of the stratified column to 1½ tanks. To this end, refractometers are provided in the fluid lines which convey infusing liquor from the top of one tank to the bottom of the next tank, the refractometers measuring the Brix of the liquor as it exits a tank. If the Brix is too high, during cycle n the flow rate is slowed up. If the Brix is too low, the flow rate is increased.

Once tank 10 has been isolated and flow has been established through tanks 12 to 14, during a second time period of cycle n, the berries and infusing liquor surrounding the berries in tank 10 are dumped for further processing in the manner set forth below. Subsequently, tank 10 is refilled with fresh berries and thawing liquid. In addition, the berries are secured in place with a screen.

During the next cycle n+1, tank 12 is isolated, the output from tank 14 is connected to tank 16. Tank 12 will now be dumped and refilled in the same manner as tank 10.

From the above discussion, the continuous operation may be generalized as follows. At any given time, during continuous operation, one tank in the process will be isolated out of the cycle for emptying and subsequent refilling. The tank immediately downstream of the isolated tank will be receiving only pure 70 Brix infusing liquor, and the fruit within it will be approaching saturation. A third tank, which is immediately downstream of the second tank, will be receiving stratified liquor pumped from the second tank. Finally, a fourth tank, which is immediately downstream of the third tank, may be isolated containing only thawing liquid and fruit, or it may be receiving stratified liquor from the third tank. Excess fluid from a downstream tank will be pumped into a holding tank until it is used later on. While 70 Brix has been used in the example set forth above, the infusion liquor could be at other Brix, for example 72.

At the conclusion of processing the fruit is subject to further processing. Such processing includes washing on a screen and drying to a suitable water activity level.

In the forgoing example taken from the above mentioned patent, each tank holds a layer of strawberries which is only about 3 inches deep. If the layers are more than 3 inches thick, the buoyancy of the strawberries are such that the berries on top tend to be crushed by the berries below. Furthermore, it is necessary to have tanks of very large diameters in order to secure a desired throughput of processed fruit.

OBJECTS AND SUMMARY OF THE INVENTION

It is an object of the present invention to provide an apparatus which overcomes disadvantages of the prior apparatus.

More particularly, it is an object of the present invention to provide an apparatus for processing fruit in multiple layers which will minimize labor and automate as much as possible.

It is a further object of the present invention to produce a better fruit product by processing the fruit in very thin layers It is another object of the present invention to provide an apparatus for processing fruit in thin layers, which is particularly advantageous for infused fruit with sugar.

Another object of the present invention is to make an apparatus which meets customer requirements of throughput, as well as minimize floor space.

It is yet another object of the present invention to provide an apparatus which can be cleaned in place.

A still further object of the present invention is to provide an apparatus which will minimize convection mixing of the stratified column of infusing liquor.

These and other objects of the present invention will be apparent to those skilled in the art after a consideration of the following detailed description taken in conjunction with the accompanying drawings in which a preferred form of this invention is illustrated.

DETAILED DESCRIPTION

Figure 1:
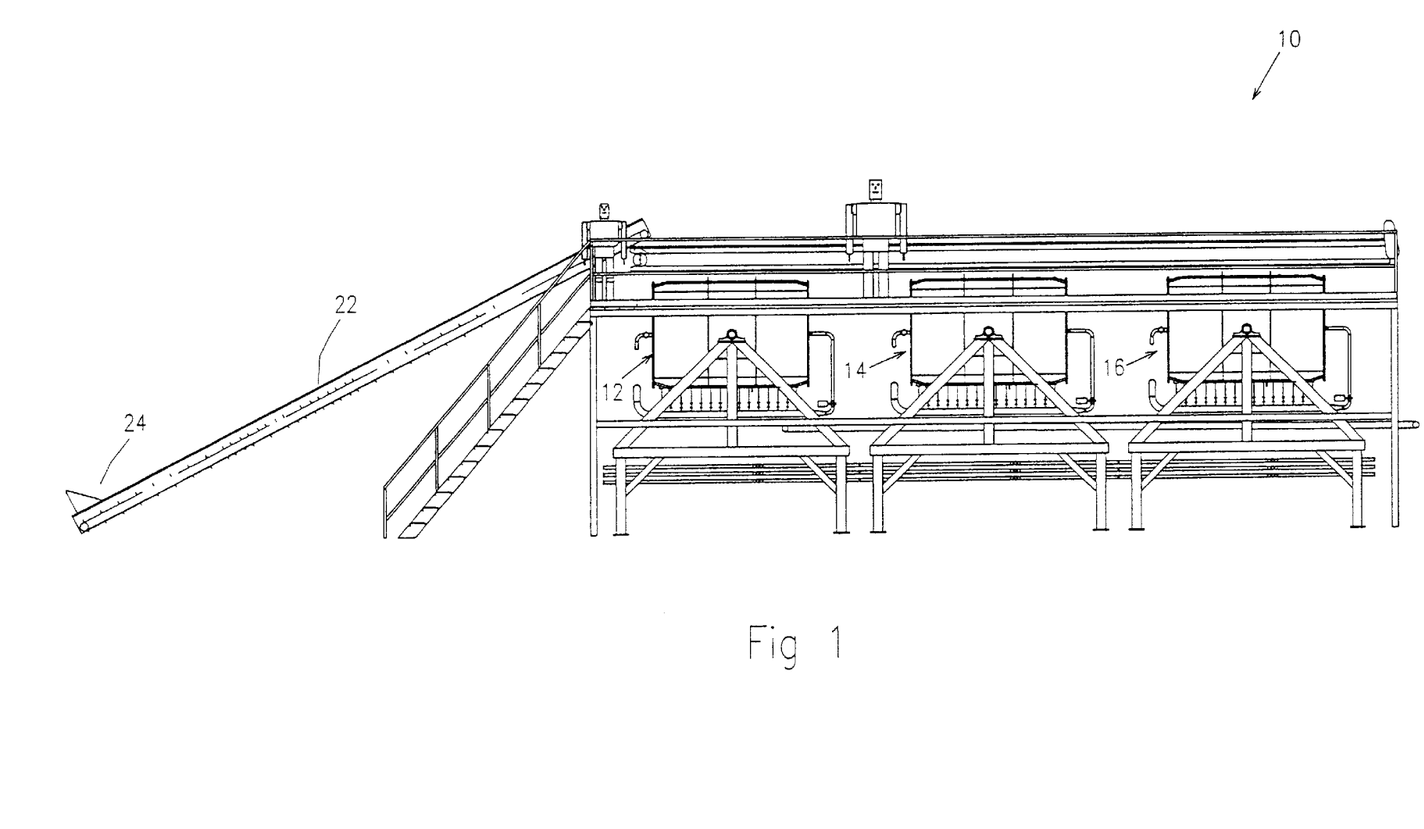
FIG. 1 is an elevational view of a continuously operated apparatus for processing fruit in multiple layers in accordance with the principles of this invention, the various tanks assemblies being shown in a horizontal loading position.
Figure 2:
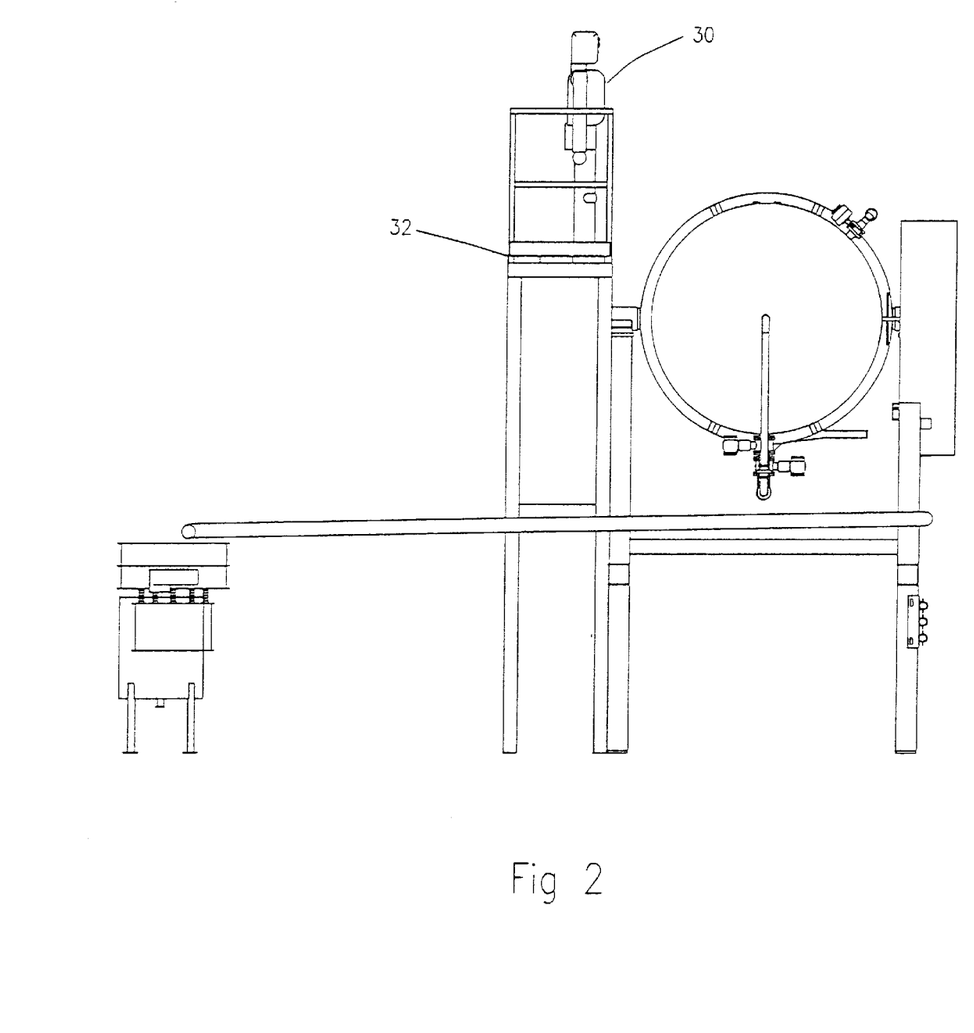
FIG. 2 is an end view of the continuously operated apparatus shown in FIG. 1.
Figure 3:
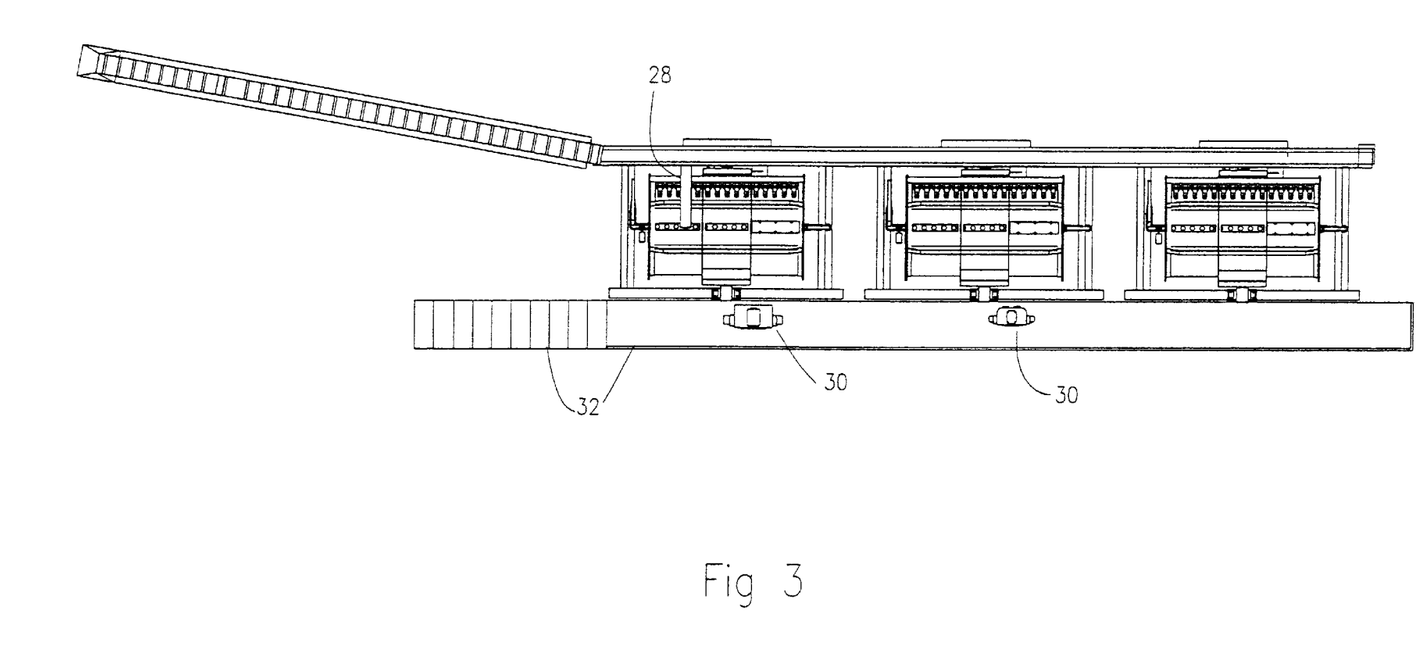
FIG. 3 is a plan view of the continuously operated apparatus shown in FIG. 1.

With reference now to FIG. 1, a continuously operated apparatus for processing fruit is illustrated, the apparatus being indicated generally by reference numeral 10. This apparatus consists of three tank assemblies indicated generally at 12, 14, and 16. Each of the tank assemblies includes a support structure indicated generally by reference numeral 18 (in FIG. 5) and a drum indicated generally at 20. In FIG. 1 all of the drums are shown in their loading position. To facilitate loading of the drums, an elevator 22 is provided, which elevator has a hopper 24 which receives the fruit to be loaded. The elevator 22 discharges the fruit on to a longitudinally extending conveyor 26. Furthermore, a cross conveyor 28 is provided, which cross conveyor has a wiper for wiping the fruit off the conveyor 26 onto the cross conveyor 28 for subsequent discharge into a selected drum. Typically the operation of the cross conveyor, as well as the position of the drums is under the control of operators 30, two of which are shown upon catwalk 32.

Figure 5:
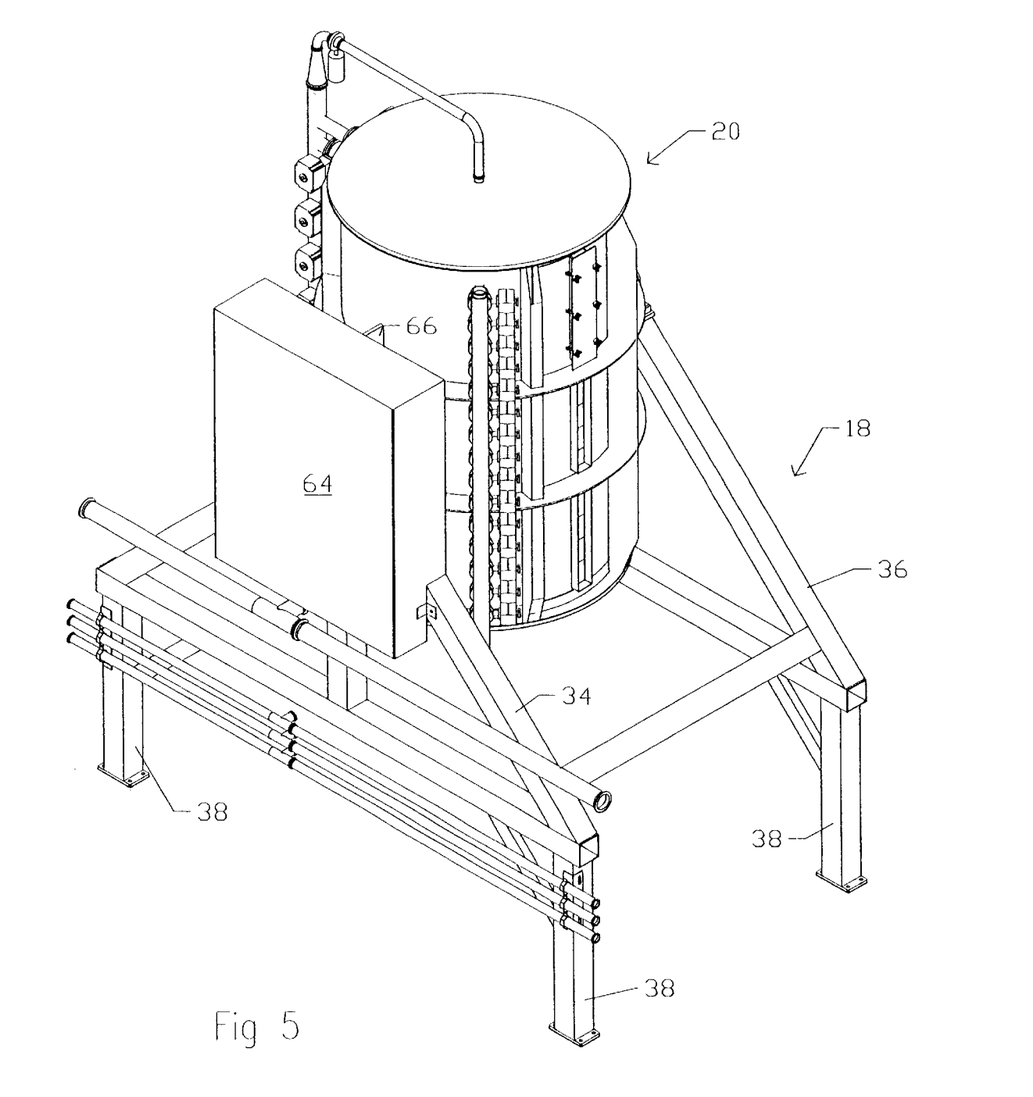
FIG. 5 is a perspective view of a single tank assembly and its associated support structure, the tank assembly being shown in its vertical position which is used for processing or harvesting fruit.
Figure 6:
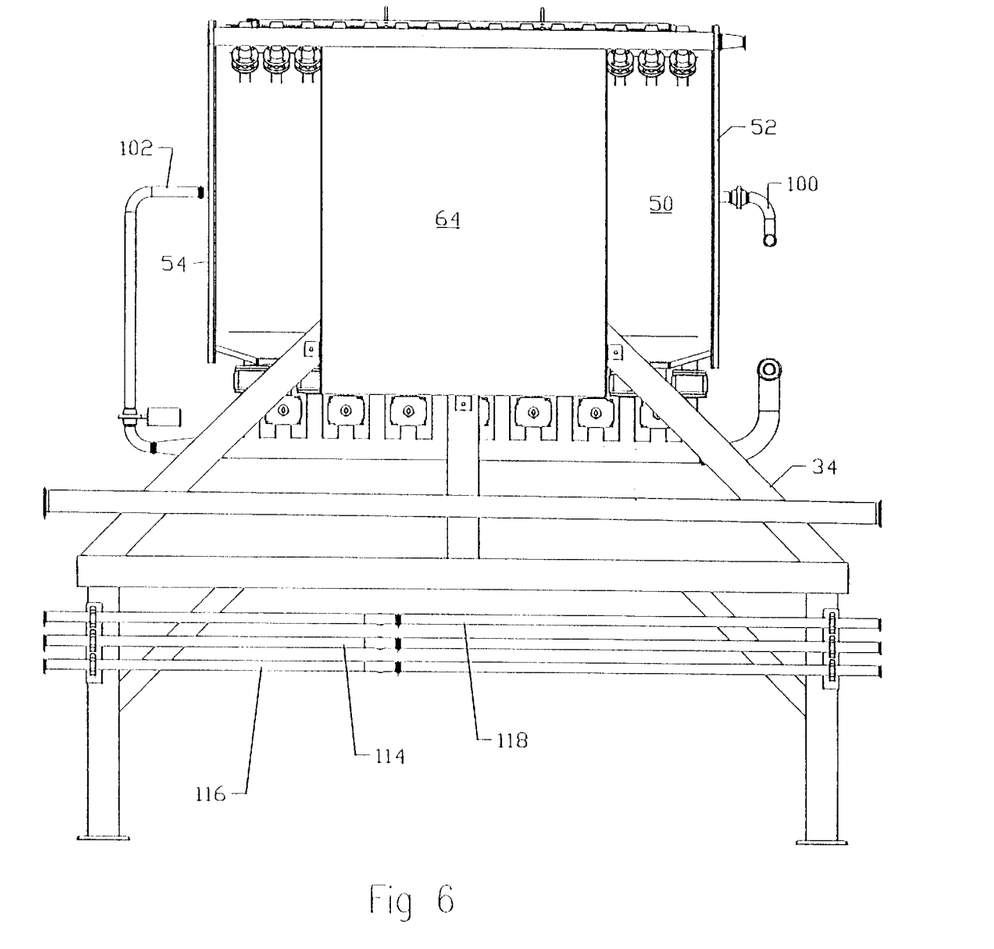
FIGS. 6–8 are elevational, end, and top plan views, respectively, of the structure shown in FIG. 5, the tank assembly being shown in its horizontal position.
Figure 7:
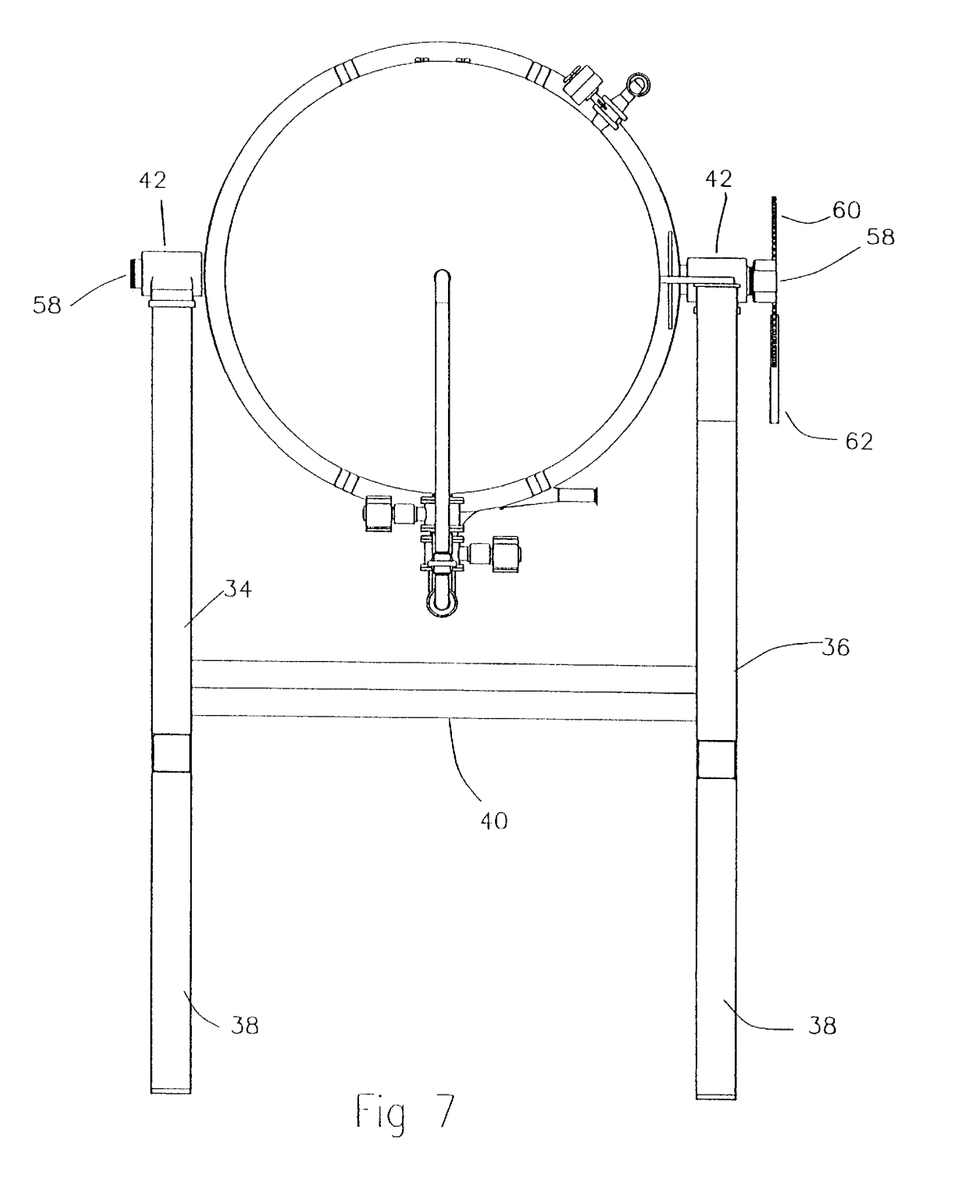
Figure 8:
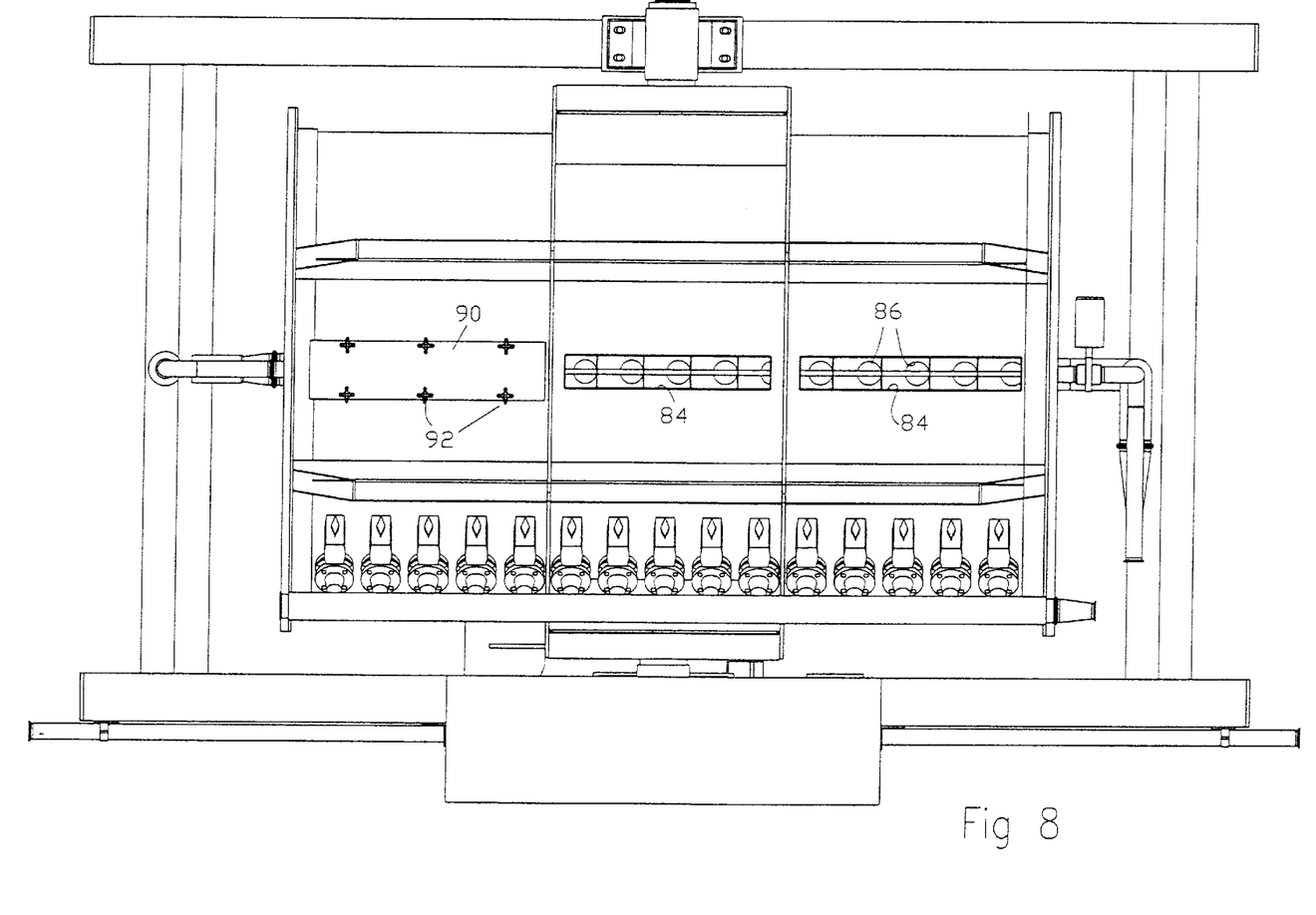

With reference now to FIG. 5, the support structure 18 consists of front and rear triangular frame assemblies indicated at 34 and 36, respectively. Each of the triangular frame assemblies includes a base member, two upwardly extending side members, and a further upwardly extending central member. In addition, each of the triangular frame assemblies is supported by vertically extending legs 38. The triangular frame assemblies 34 and 36 are connected to each other by transversely extending frame members 40. At the upper end of each of the front and rear frame assemblies a bearing block 42 is provided.

Mounted upon each of the support structures 18 is a drum 20. The drum consists of a generally cylindrical side wall 50 and spaced apart first and second ends 52, 54. As the drum is quite large in the illustrated embodiment, for example having a distance between the ends of 96 inches, it is provided with suitable reinforcement flanges and gussets (not numbered). Saddle structures are provided at opposite sides of the drum, which saddle structures have fixed thereto suitable pivots 58. The pivots are in turn received in the opposed bearing blocks 42. It can thus be seen that the drums 20 are supported by the support structures 18 in such a manner that they are free to rotate between the horizontal positions shown in FIG. 1 and the vertical positions shown in FIG. 5. In order to rotate each drum 20 between its horizontal and vertical positions, a driven sprocket 60 is mounted on one of the pivots 58, the driven sprocket 60 being caused to be rotated via chain 62 which is driven in any suitable manner. In FIG. 5 the driven sprocket 60, chain 62, and drive motor and drive sprocket are covered by guard 64. With reference to FIG. 1, the drum 20 is rotated from its horizontal working position to its vertical position in a clockwise direction. To return it back to its loading position it is rotated in a counter-clockwise direction. To limit over rotational when returning to its loading position, the drum is provided with a stop plate 66 which may contact a suitable stop (not shown) carried by one of the upwardly extending side members of the triangular frame 34.

Figure 9:
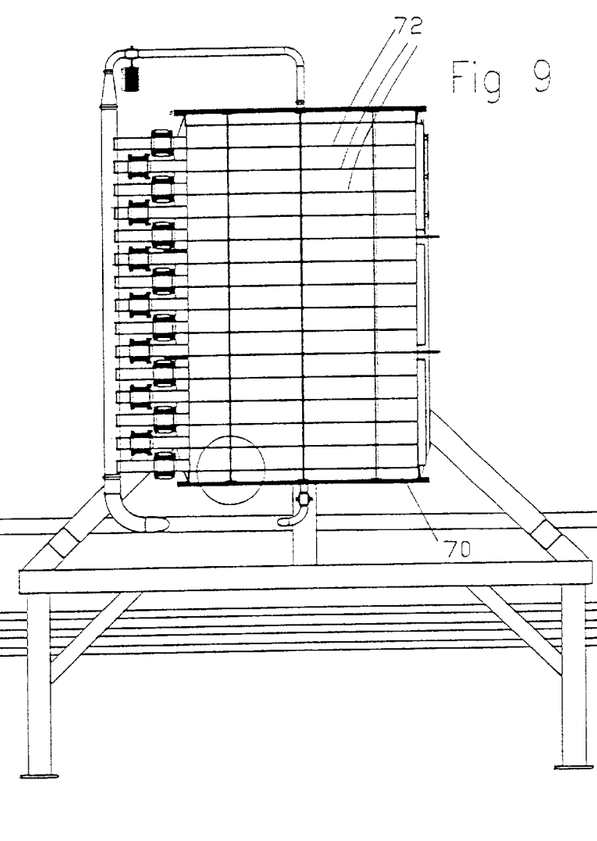
FIG. 9 is a side sectional view of the structure shown in FIG. 5.
Figure 10:
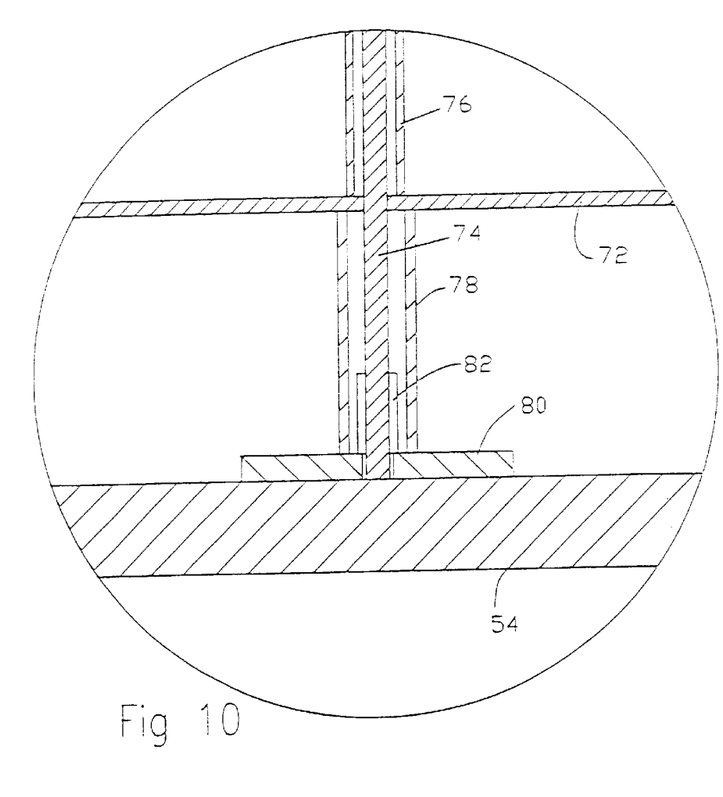
FIG. 10 is an enlargement of a portion of the structure shown in FIG. 9.

With reference now to FIGS. 9 and 10, each drum is provided with a screen assembly indicated generally at 70. Each screen assembly consists of a plurality of spaced apart screens 72. In the illustrated embodiment there are 16 screens. Each screen is formed of a woven wire, but other forms of screens may be utilized. As can be seen from FIG. 9, the screens extend entirely across the drum. Thus, the fruit within the chambers between adjacent screens cannot pass around the screens. The screens are secured to each other by rods 74, spacers 76 and 78, washers 80, and nuts 82. At the lower end of a screen assembly, as shown in FIG. 10, a washer 80 has a nut 82 tack welded to it above the aperture in the washer. Rod 74, which is provided with threads at either end, is threaded into the nut 80 until its lower end is flush with the lower surface of the washer 80. A short spacer (about three inches long) is then placed about the lower end of the rod 74 and nut 82. In between adjacent screens 72 a longer spacer 76 is employed, the length of the spacers 76 and the thickness of the screen 72 being six inches in the preferred embodiment. At the upper end of the screen assembly 70 a further washer 80 bears against another short spacer 78, and washer 80 is held in place by a nut 82. The screen is assembled outside of the drum and is placed into the drum as an entire sub-assembly. The screen assembly consists of 16 screens and six rods, there being one central rod and five rods spaced radially outwardly of the central rod, and equal distances from each other. As can be seen, there are fifteen fruit processing chambers between the sixteen screens Each drum is provided with loading openings 84, discharge ports 86, and clean-in place ports 88. Each of the loading openings 84 may be closed via a cover 90 which may be held in place by suitable fasteners 92. When it is desired to load the drum 20, all of the covers 90 will be removed from the loading openings 84. The conveyor's 26 and 28 will be operated to load fruit into the chambers between screens, typically starting at the end closest to the hopper and proceeding to a location spaced away from the hopper. The chambers between the screens may be only half filled with the fruit, as would be the case when infusing sugar into strawberries. In any event, the chambers between the screens are suitably filled to the desired fill level depending upon the particular fruit and the particular processing. After a drum 20 has been filled the desired amount, the openings 84 will be close via the covers 90 which are suitably fastened in place. Then the drum will be rotated to its vertical position shown in FIGS. 4 and 5.

In order to process the fruit within a tank assembly it is necessary to introduce the processing liquid into the drum. To this end, a first conduit assembly 100 is secured to the first end 52 of a drum, and a second conduit assembly 102 is secured to the second end 54 of the drum. A valve 104 in conduit 100 is opened to permit the inflow of a processing fluid, for example an infusing liquor. This processing fluid will flow through the fruit at a suitable rate, which is controlled by a pump assembly, not shown. When the associated tank is filled with the processing fluid it will then flow through the second conduit assembly 102.

A short discharge line 108 is associated with each of the discharge ports 86, the discharge line being provided with a suitable valve 110. At the completion of processing of the fruit within the tank, a valve 106 in the discharge conduit 102 is closed and the valve 110 in the uppermost discharge line 108 is opened. This will cause the processing fluid to be discharged through the discharge line 108 into collector line 112, this portion of the process also being called harvesting. When no more fruit is being discharged from the chamber between the two uppermost screens, the valve 110 in the next lower discharge line 108 is opened, the valve 110 in the line above it is closed, and fluid in the drum between the next two screens will be discharged into the collector line 112. This process will be continued until all of the chambers between the screens have been emptied. At this time, if desired, a cleaning solution can be introduced into the drum through the clean-in place ports.

The apparatus shown in FIGS. 1–4 may be used for continuously processing fruit. Such a process will be described in conjunction with infusing cranberries with sugar. At the start of the processing, all drums are in the horizontal loading position shown in FIG. 1. Mounted on the support structure are a number of fluid lines, including a line 114 for infusing syrup, a line 116 for processed fruit, and a line 118 for thawing fluid, which preferably is fruit juice. These lines may be suitably connected to the inlet and outlet conduit assemblies by suitable valved connector lines, not shown.

In step one, the beginning of day one, drum one is loaded with frozen cranberries, for example 4566 pounds. In step two, drum one is moved from its horizontal loading position to its vertical operating position. The inlet and outlet conduits are then suitable connected to a thawing fluid line so that thawing fluid, preferably cranberry juice which has been suitably warmed, can enter the lower end of the drum and exit from the upper end of the drum. The time interval for thawing may be an hour or a little longer.

In step three, the inlet conduit assembly 100 to drum one is then suitably connected to an infusion syrup line of pure 70 Brix infusing liquor, and the second conduit assembly 102 is suitably connected to a line which will discharge the mixed juice and strata of infusion fluids to a pull-off tank. The flow through drum one will be slow, and the fruit within drum one will be initially processed for about 22 to 24 hours.

In step four, the beginning of day two, drum two will be loaded with frozen cranberries, moved to its vertical operating position, connected to a thawing fluid line in the same manner that drum one is connected in step two, and the cranberries in drum two will be thawed. During this step, fluid from drum one will continue to be discharged to the pull-off tank.

In step five, the infusion liquor which is being discharged from drum one through the second conduit assembly 102, which is now a stratified column of infusing liquor, is caused to flow into drum two through the first conduit assembly 100 for drum two. The discharge from drum two is through the second conduit assembly 102 for drum two to the pull-off tank. This step will continue until about 48 hours after the start of step one.

In step six, the beginning of day three, drum three is loaded with frozen cranberries, moved from its horizontal loading position, connected to the thawing liquid which is then caused to thaw the cranberries within drum three. During this time interval, which may be as long as three hours, the stratified column of infusion liquor from drum two is still being discharged to the pull-off tank.

In step seven, the outflow from conduit 102 of drum two is connected to the inflow conduit of drum three to cause the stratified column of infusing fluid to flow into tank three. The outflow from conduit 102 of tank three goes to the pull-off tank.

In step eight the 70 Brix infusion liquor input is disconnected from drum one and is connected to the input conduit 100 of drum two. After this portion of this step has been completed, the fruit within drum one is harvested. This is done by connecting the first conduit assembly of drum one to a source of fluid other than the infusing liquor, closing the valve 106 in the discharge conduit 102, and opening the valve 110 in the uppermost discharge line 108. This will cause the processed fruit and fluid to be discharged through the discharge line 108 into collector line 112. The processed fruit will then flow to a further processing area such as a vibratory deck and recoup tank, and then to a drying area. This will not be discussed further as this forms no part of the present invention and is more fully discussed in U.S. Pat. No. 6,159,527.

In step nine, the beginning of day four, drum one will be loaded again while in a horizontal position, while the berries in tanks two and three are being processed further.

In step ten, drum one will be rotated to a vertical position, and the berries within the drum will be thawed in the manner set forth above.

Figure 4:
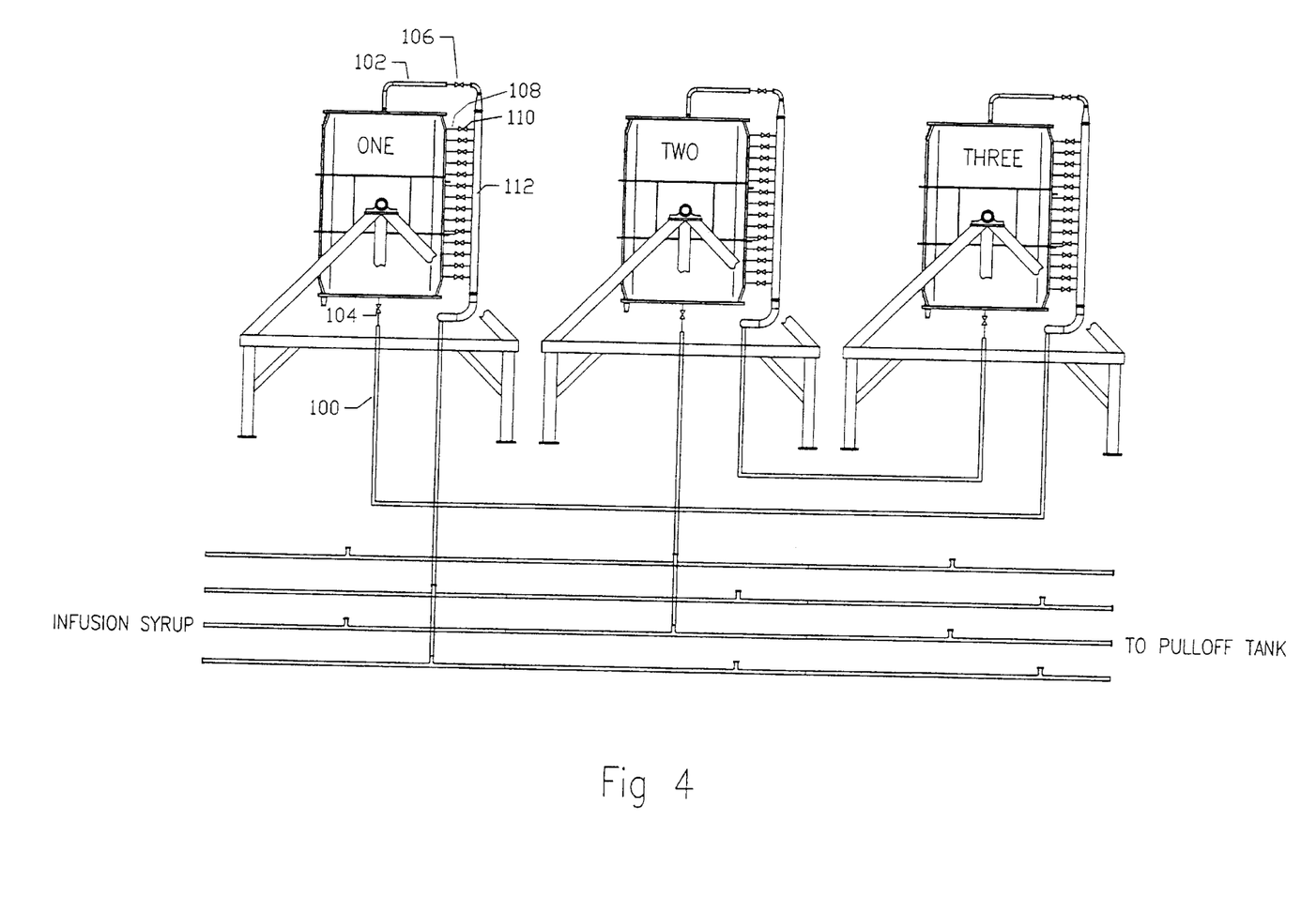
FIG. 4 is an elevational view of the continuously operated apparatus shown in FIG. 1 when used for infusing fruit with sugar, the tank assemblies all being shown in infusing or harvesting position, this figure illustrating circuit flow immediately after the fruit in drum one has been thawed, with the fruit in drums two and three still being infused with sugar.

In step eleven, the stratified column of infusing liquor from drum three will be directed to the input conduit 100 of drum one, and the output from drum one will be directed through the output conduit 102 to a pull-off tank. This step is illustrated in FIG. 4.

In step twelve, after flow has been established for drum three to drum one and then to the pull-off tank, drum two will be taken off the infuser flow, the infusing liquor now being directed directly to drum three. The processed fruit in drum two can now be harvested.

In step thirteen, the beginning of day five, fruit will be loaded into drum two, which drum has been placed in its horizontal loading position.

In step fourteen, drum two will be returned to its vertical operating position, and the fruit within drum two will be thawed.

In step fifteen, after the fruit in drum two has been thawed, its input will be connected to the output of drum one, the output of drum two will be to the pull-off tank, and drum three will be isolated for harvesting the fruit within the drum.

Step sixteen is similar to step six. Additional steps should be obvious to one having ordinary skill in the art. It should be thus seen, that the present invention provides a continuously operated apparatus for processing fruit in multiple layers. This apparatus will provide a better fruit product than that which has been provided by other apparatus.

While a preferred form of this invention has been described above and shown in the accompanying drawings, it should be understood that applicant does not intend to be limited to the particular details described above and illustrated in the accompanying drawings, but intends to be limited only to the scope of the invention as defined by the following claims. While the invention was developed for infusing multiple layers of fruit with sugar, it may also be used with other vegetable products, as noted above. Furthermore, fruit may be infused with liquids which contain items other than sugar. In addition, the above described apparatus may also be used for herbal extraction, for example extracting vanilla from vanilla beans.

What is claimed is:

1. An apparatus for processing fruit in multiple layers comprising:
    a tank assembly including a drum and a screen assembly mounted within the drum, the drum having spaced apart first and second ends, and sidewalls provided with
        one or more openings for loading the fruit which is to be processed and
        a plurality of spaced apart discharge ports through which processed fruit may be discharged,
    the screen assembly including a plurality of spaced apart screens mounted between the first and second ends for the purpose of separating layers of the fruit which is to be processed;
    a first conduit assembly connected to the first end of the tank assembly through which a fluid may be introduced into the tank assembly;
    a second conduit assembly connected to the second end of the tank assembly through which a fluid may be discharged from the tank assembly; and
    support structure for supporting the tank assembly.

2. The apparatus for processing fruit in multiple layers as set forth in claim 1 wherein the spaced apart screens extend across the full width of the tank assembly.

3. The apparatus for processing fruit in multiple layers as set forth in claim 2 wherein there is a discharge port between adjacent screens so that the fruit between selected screens may be discharged individually.

4. The apparatus for processing fruit in multiple layers as set forth in claim 3 further characterized by the provision of a valve for each of the discharge ports, the valves normally being closed, except when processed fruit is to be harvested by discharging from the tank.

5. The apparatus for processing fruit in multiple layers as set forth in claim 4 wherein the valves may be sequentially opened so that fruit between screens may be sequentially discharged.

6. The apparatus for processing fruit in multiple layers as set forth in claim 2 wherein a plurality of cleaning ports are provided in the sidewall of the tank so that the tank assembly may be cleaned in place.

7. The apparatus for processing fruit in multiple layers as set forth in claim 6 wherein there is a cleaning port for each discharge port, the cleaning ports being located between adjacent screens.

8. The apparatus for processing fruit in multiple layers as set forth in claim 1 wherein the support structure supports the tank assembly for movement between a horizontal loading position and a vertical processing position, the spaced apart screens being generally horizontal when the tank assembly is in its vertical position.

9. The apparatus for processing fruit in multiple layers as set forth in claim 1 further characterized by the provision of a removable cover for each of the openings for loading the fruit.

10. The apparatus for processing fruit in multiple layers as set forth in claim 1 wherein the screen assembly includes a plurality of connector assemblies.

11. The apparatus for processing fruit in multiple layers as set forth in claim 4 wherein each connector assembly consists of a rod, threaded at its ends, each rod being passed through the plurality of screens, and each connector assembly further including a plurality of spacers being disposed about the rod in such a manner that there is a spacer between adjacent screens, each connector assembly further including nuts at each end of each rod to hold the screens together.

12. continuously operated apparatus for processing fruit in multiple layers comprising:
    at least three tank assemblies, each tank assembly including a drum and a screen assembly mounted within the drum, the drum having spaced apart first and second ends and sidewalls provided with
        one or more openings for loading the fruit which is to be processed, and
        a plurality of spaced apart discharge ports through which processed fruit may be discharged,
    the screen assembly including
        a plurality of spaced apart screens mounted between the first and second ends for the purpose of separating layers of the fruit which is to be processed;
    support structure for supporting each of the tank assemblies for independent rotational movement between horizontal and vertical positions;
    a first conduit assembly for each tank assembly, the first conduit assembly having first and second ends, the first end being connected to the first end of the drum of the associated tank assembly;
    a second conduit assembly for each tank assembly, the second conduit assembly having first and second ends, the first end being connected to the second end of the drum of the associated tank assembly; and
    means for controlling the flow of fluid through the various conduits so that one tank assembly may be loaded, and emptied while fruit in the other tank assemblies is being processed.

13. The continuously operated apparatus for processing fruit in multiple layers as set forth in claim 12 wherein there is only one screen between adjacent discharge ports.

14. An apparatus for infusing fruit with sugar in multiple layers, comprising:

a tank assembly including a drum and a screen assembly mounted within the drum, the drum having spaced apart first and second ends, and sidewalls provided with one or more openings for loading the fruit which is to be processed and a plurality of spaced apart discharge ports through which processed fruit may be discharged, the screen assembly including a plurality of spaced apart screens mounted between the first and second ends for the purpose of separating layers of the fruit which is to be processed;

support structure for supporting the tank assembly for movement between a horizontal loading position and a vertical processing position, the spaced apart screens being generally horizontal when the tank assembly is in its vertical position;

a first conduit assembly connected to the first end of the tank assembly through which an infusing liquor may be introduced into the tank assembly; and a second conduit assembly connected to the second end of the tank assembly through which a stratified column of infusing liquor or fruit juice may be discharged from the tank assembly.

* * * * *

UNITED STATES PATENT AND TRADEMARK OFFICE
CERTIFICATE OF CORRECTION

PATENT NO.     : 6,457,403 B1
DATED          : October 1, 2002
INVENTOR(S)    : Dale E. Wettlaufer et al.

It is certified that error appears in the above-identified patent and that said Letters Patent is hereby corrected as shown below:

<u>Column 10,</u>
Line 29, "4" should be -- 10 --.
Line 36, -- A -- should be inserted before "continuously".

Signed and Sealed this

Thirteenth Day of April, 2004

JON W. DUDAS
*Acting Director of the United States Patent and Trademark Office*